No. 763,353. PATENTED JUNE 28, 1904.
J. E. BERRY.
GLASS DRAWING MACHINE.
APPLICATION FILED MAR. 24, 1904.
NO MODEL. 3 SHEETS—SHEET 3.
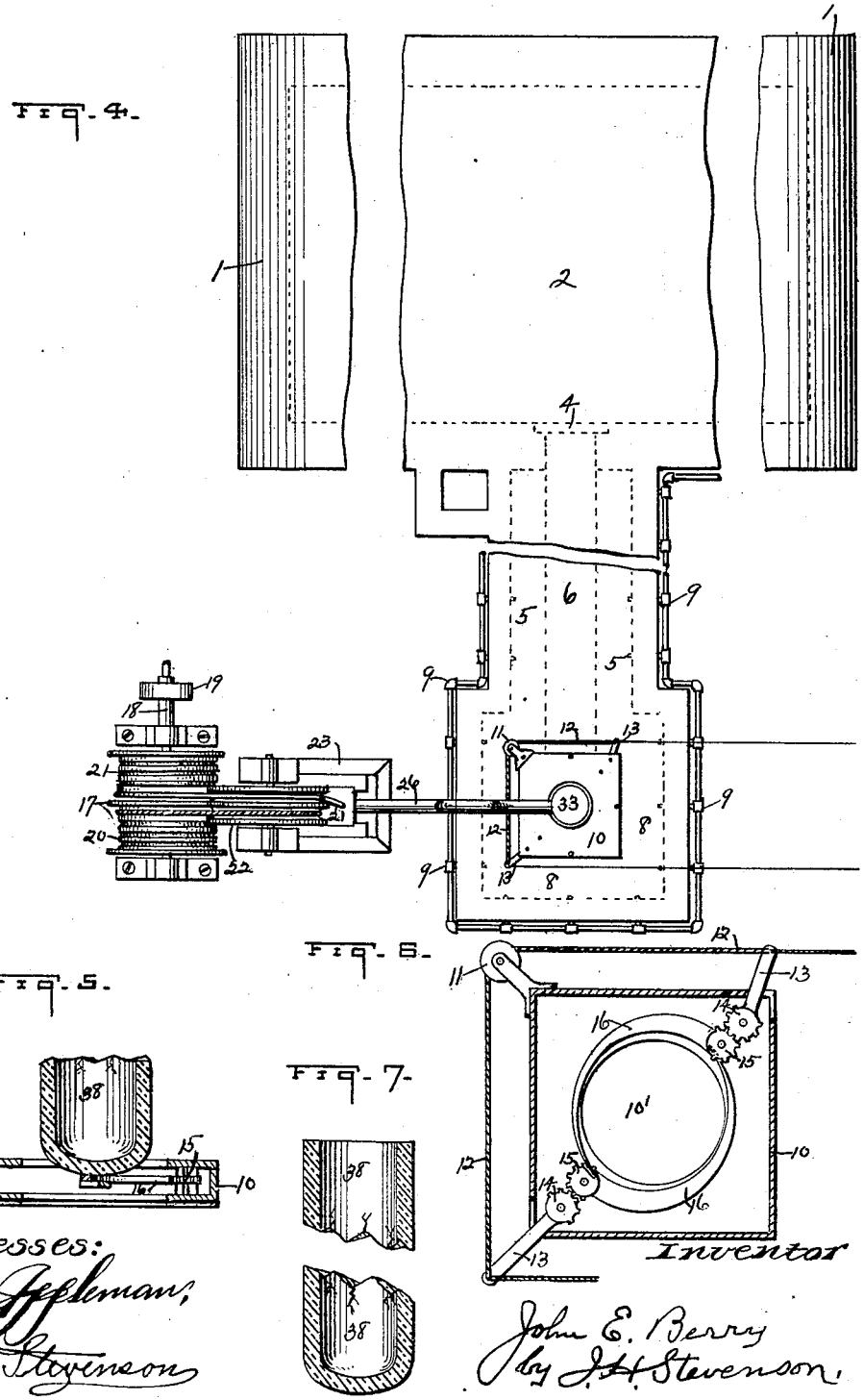

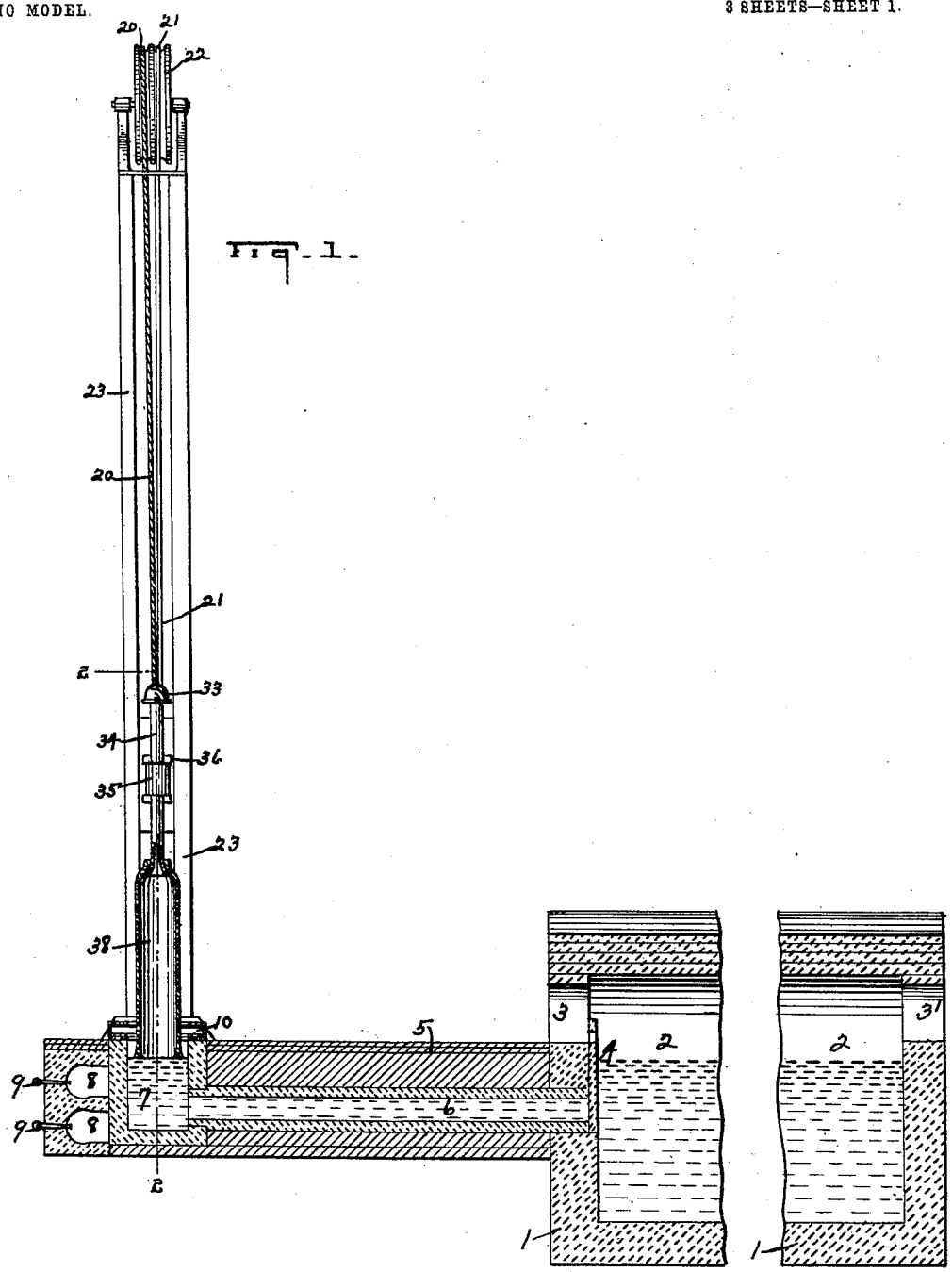

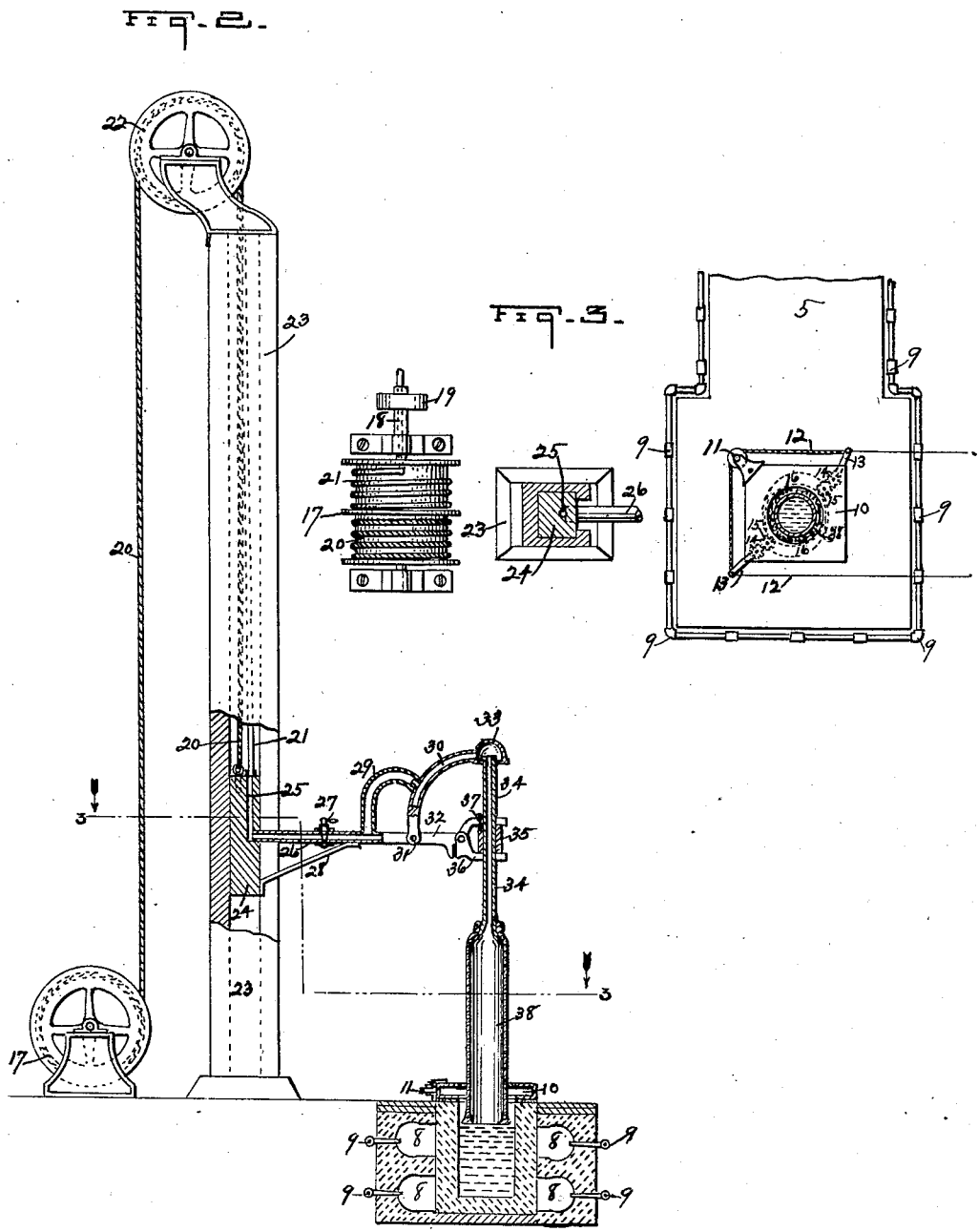

No. 763,353.

Patented June 28, 1904.

UNITED STATES PATENT OFFICE.

JOHN E. BERRY, OF MONONGAHELA, PENNSYLVANIA.

GLASS-DRAWING MACHINE.

SPECIFICATION forming part of Letters Patent No. 763,353, dated June 28, 1904.

Application filed March 24, 1904. Serial No. 199,681. (No model.)

*To all whom it may concern:*

Be it known that I, JOHN E. BERRY, a citizen of the United States, residing at Monongahela city, in the county of Washington and State of Pennsylvania, have invented certain new and useful Improvements in Glass-Drawing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is an improved means of manufacturing plate, window, and cathedral glass, whereby the same is drawn into cylinders by means of compressed air before being formed into sheets.

In the accompanying drawings, in three sheets, forming a part of this specification, I have illustrated my invention by several views, in which—

Figure 1, Sheet 1, is a longitudinal section of the melting-chamber, communicating channel, and gathering or drawing chamber, and operating-tower used in conjunction therewith, showing a cylinder of drawn glass partially lifted out of the gathering-chamber. Fig. 2, Sheet 2, is a perpendicular side and part sectional view of the operating-tower showing means of introducing compressed air to the glass cylinder. Fig. 3 is a top plan and sectional view of the hoisting-drum, tower and cutting device, taken on the line 3 3 of Fig. 2. Fig. 4, Sheet 3, is a top plan view of my improved furnace and blowing device. Fig. 5 is a cross-sectional view of the cutting device, showing the lower section of a glass cylinder in position. Fig. 6 is a top sectional view of the device I employ in cutting the drawn cylinder away from the molten glass. Fig. 7 is a broken section of the lower part of a drawn glass cylinder.

Numerals of reference designate like parts throughout the several views, in which—

The numeral 1 is the body of the furnace. 2 is the melting-chamber.

3 and 3' are working holes formed in the walls of the furnace, and 4 is a stopper adjustable through the opening 3.

5 is an extension to the furnace 1, formed at right angles therewith, in the center of which is an inclosed channel 6, communicating direct with the melting-chamber of the furnace and ending in a gathering or drawing chamber 7, formed in the center of an enlarged portion of the extension 5.

8 8 are double heating-chambers formed in the blocks forming the walls surrounding the gathering-chamber 7, into which gas is introduced through the burners 9 9.

10 is a hollow square casting seated on the top of the gathering-chamber, having a central opening 10' therein, through which the glass cylinder is drawn from the gathering-chamber.

11 is a sheave or pulley attached to one corner of the casting 10, through which is passed the operating cord or rope 12. Attached to this rope 12 and entering the casting at the upper right-hand and lower left-hand corners thereof are two levers 13 13, to the inner ends of which are attached the cog-wheels 14 14. Meshing into these two cog-wheels are the cogs 15 15, which operate the knives 16 16.

17 is a double hoisting-drum, located at one side of and adjacent to the operating-tower.

18 is a hollow shaft operating the double drum, through which compressed air is introduced to the conveying-hose 21, wound on one side of the drum 17.

19 is a belt-wheel on the hollow shaft 18, designed to be connected with a driving means.

20 is a hoisting-rope wound on the opposite side of the drum 18 from the air-hose 21.

22 is a double carrying-sheave affixed to the top of the operating-tower 23, over which is carried the hoisting-rope 20 and air-hose 21, the ends of the same being connected with a sliding air-box 24, operatively located inside the tower 23.

25 is an air-passage formed in the sliding air-box 24 and communicating with the air-hose 21.

and having a cutting device located in the interior thereof; an operating-tower situated at one side of the gathering-chamber; means operatively connected with said tower for raising and lowering a sliding air-box contained therein; air-pipes connected thereto for conveying the compressed air to a blowpipe, and means of releasing the blowpipe from the connecting air-pipes substantially as described and shown.

In testimony whereof I affix my signature in presence of two witnesses.

JOHN E. BERRY.

Witnesses:
 JOSEPH WHARTON,
 H. H. WILLIAMS.